(12) United States Patent
Takezawa

(10) Patent No.: US 6,590,575 B1
(45) Date of Patent: Jul. 8, 2003

(54) METHOD FOR DESIGNING THREE-DIMENSIONAL FREE-FORM SURFACE AND APPARATUS FOR EXECUTING THE SAME

(75) Inventor: Kunio Takezawa, Tsukuba (JP)

(73) Assignee: National Institute of Agro Environmental Sciences, Ibaraki-Kin (JP)

( * ) Notice: Subject to any disclaimer, the term of this patent is extended or adjusted under 35 U.S.C. 154(b) by 0 days.

(21) Appl. No.: 09/706,137

(22) Filed: Mar. 12, 1999

Related U.S. Application Data

(63) Continuation-in-part of application No. 08/596,984, filed on Feb. 5, 1996, now abandoned, which is a continuation of application No. 08/431,637, filed on May 1, 1995, now abandoned, which is a continuation of application No. 08/036,446, filed on Mar. 24, 1993, now abandoned.

(30) Foreign Application Priority Data

Oct. 22, 1992 (JP) ............................................. 4-324576

(51) Int. Cl.$^7$ .............................................. G06T 15/00
(52) U.S. Cl. ...................................... 345/419; 345/420
(58) Field of Search ................................. 345/419, 420

(56) References Cited

U.S. PATENT DOCUMENTS 4,829,456 A    5/1989   Joonishi et al.
4,885,702 A  * 12/1989   Ohba .......................... 345/419
4,888,713 A    12/1989   Falk

OTHER PUBLICATIONS

Hsu et al. Direct Manipulation of Free–form Deformations ACM–0–89791–479–1/92/007/0177.*
Hsu et al.Direct Manipulation of Free–form Deformations ACM–0–89791–479–1/92/007/0177, 1992.*

* cited by examiner

*Primary Examiner*—Mano Padmanabhan
(74) *Attorney, Agent, or Firm*—McCormick, Paulding & Huber LLP

(57) ABSTRACT

A method and apparatus for interactively generating data indicative of a three-dimensional free-form surface and visually displaying the surface comprising setting three-dimensional positional data representing sample points on the three-dimensional free-form surface to be generated and at least one auxiliary weight function. Then, calculating virtual data Yjm using the three-dimensional positional data and auxiliary weight function K2$m$. Next, calculating at least one main weight function K1$j$ using the auxiliary weight function and virtual data so that the main weight function K1$j$ is equal to a value other than zero at one sample point and is equal to zero at the remaining sample points. Then, calculating interpolation, values of the free-form surface using the main weight function K1$j$ and virtual data to obtain data indicative of a modified three-dimensional free form surface. Finally, adjusting the data represent said sample points, and adjusting the auxiliary weight function with changing sample point data.

4 Claims, 6 Drawing Sheets

METHOD FOR DESIGNING THREE-DIMENSIONAL FREE-FORM SURFACE AND APPARATUS FOR EXECUTING THE SAME

REFERENCE TO RELATED APPLICATIONS

This is a continuation-in-Part of application Ser. No. 08/596,984, filed Feb. 5, 1996 now abandoned; which is a continuation of application Ser. No. 08/431,637, filed May 1, 1995 now abandoned; which is a continuation of application Ser. No. 08/036,446, filed Mar. 24, 1993 now abandoned.

BACKGROUND OF THE INVENTION

1. Field of the Invention

The present invention relates to a method and an apparatus for designing a creative free-form surface in three-dimensional space and also for designing a free-form surface from a map indicating altitude or density and from coordinates of a three-dimensional object.

2. Description of the Prior Art

A free-form surface is designed for reproducing or modifying a curved surface existing in natural environment, or a curved surface obtained by experience, on computer, and also for designing a curved surface of buildings and industrial products.

In the past, a Bezier curved surface, a B-spline curved surface, a NURBS curved surface, a Gregory curved surface, etc. have been used for designing a curved surface on a computer. For example, the Bezier curved surface is expressed by the equation (1):

$$S(u, v) = \sum_{i=0}^{n} \sum_{j=0}^{m} B_i^n(u) B_j^m(v) P_{ij} \tag{1}$$

Vector $S(u,v)$ is a position vector of a point on curved surface in three-dimensional rectangular coordinate system xyz, i.e.:

$$S(u,v) = \{x(u,v), y(u,v), z(u,v)\} \tag{2}$$

where u and v are real parameters, which change within the range of $0 \leq u \leq 1$ and $0 \leq v \leq 1$ respectively.

Vector Pij (i=0, . . . ,n; j=0, . . . , m) is a position vector of a control point of Bezier curved surface, and $B_i^n(u)$ is Bernstein's basic function, i.e.:

$$B_i^n(u) = \frac{n!}{i!(n-i)!} u^i (1-u)^{n-1} \tag{3}$$

Meanwhile, $B_i^n(u)$ is in form of a binomial coefficient with the relationship:

$$\sum_{i=0}^{n} B_i^n(t) = \{(1-t)+t\}^n = 1 \tag{4}$$

The sum of the product of two Bernstein's basic functions is 1.

$$\sum_{i=0}^{n} \sum_{j=0}^{m} B_i^n(u) B_j^m(v) = \{(1-u)+u\}^n \{(1-v)+v\}^m = 1 \tag{5}$$

In the equation (5), if n=m=3, the following relationship exists for each value of u and v:

$$a_{00}+a_{10}+a_{20}+a_{30}+ \ldots +a_{03}+a_{13}+a_{23}+a_{33}=1 \tag{6}$$

Point vector S(u, v) on a curved surface is given by:

$$S(u, v) = a_{00}P_{00}+a_{10}P_{10}+ \ldots +a_{23}P_{23}+a_{33}P_{33} \tag{7}$$

$a_{00}$ to $a_{33}$ are the product of two Bernstein's functions. FIG. 8 represents Bezier curved surface in this case.

From the equations (6) and (7), a point on the curved surface can be given by barycentric coordinates having weight on each of control points. Thus, it is evident that the shape of Bezier curved surface can be changed within a convex polyhedron including control points by moving each control point vector Pij. The other curved surface such as B-spline surface, NURBS surface, and Gregory surface are given by the function using parameters u and v and control point vector Pij as in the case of Bezier surface. Thus, the shape of curved surface can be changed by control points.

On the other hand, in deforming the shape of a free-form surface, curved surface is not moved in any of expression modes of the above free-form surfaces, and inherent parameters for expressing shape are changed and the shape is indirectly deformed.

In other words, when the shape of the curved surface is deformed, it is not that points of the curved surface are directly manipulated, but control point in neighborhood of the curved surface must be manipulated.

Therefore, it is not possible to freely design a free-form surface unless more experiences are accumulated to be able to estimate how the shap of the curved surface is changed and which of the control points is moved, or how far and which of the control points should be moved in order to deform the curved surface as desired.

SUMMARY OF THE INVENTION

Therefore, it is an object of the present invention to provide a method and apparatus which is capable of displaying a three-dimensional free-form surface on a display unit such that a desired curved surface can be obtained irrespective of the complexity of the curved surface by receiving commands from a user.

To attain the above-mentioned object, at least one auxiliary weight function is employed with plural sample points being set. The auxiliary weight function is first inputted by a user and is used to calculate virtual data and main weight function(s). The main weight function(s) is/are calculated using the auxiliary weight function and virtual data. Interpolation values are then calculated to obtain data indicative of a modified curved surface, and this curved surface is displayed. The user may adjust not only sample points but also auxiliary weight function so as to further modify the displayed curved surface. The change in the auxiliary weight function causes the change in virtual data and the main weight function(s). Therefore, the displayed curved surface can be modified at will of the user who continuously gives commands to vary the auxiliary weight function. With this arrangement, even if the sample points are fixed, various different desired curved surfaces can be obtained by changing the auxiliary weight function.

Therefore, according to the present invention, there is provided a method of interactively generating data indicative of a three-dimensional free-form surface and visually displaying the surface by a display unit, comprising the steps of:

a) setting three-dimensional positional data representing sample points on said three-dimensional free-form surface to be generated and at least one auxiliary weight function both in response to commands inputted by a user;

b) calculating virtual data using said three-dimensional positional data and said auxiliary weight function, and calculating at least one main weight function using said auxiliary weight function and said virtual data so that said main weight function equals a value other than zero at one sample point and equals zero at remaining sample points, and;

(c) calculating interpolation values of said free-form surface using said main weight function and said virtual data to obtain data indicative of a modified three-dimensional free-form surface;

(d) displaying said modified three-dimensional free-form surface by said display unit;

(e) adjusting said data representing said sample points in response to commands inputted by said user;

(f) adjusting said auxiliary weight function based on adjusted said data representing said sample points in response to commands inputted by said user; and repeating steps (b) to (f) as long as said commands are inputted in said step (e) or (f) to obtain a finally modified three-dimensional free-form surface.

There is also provided, according to the present invention, an apparatus for interactively generating data indicative of a three-dimensional free-form surface and visually displaying the surface by a display unit, comprising:

(a) means for setting three-dimensional positional data representing sample points on said three-dimensional free-form surface to be generated and at least one auxiliary weight function both in response to commands inputted by a user; and (b) means for calculating virtual data using said three-dimensional positioned data and said auxiliary weight function and calculating at least one main weight function using said auxiliary weight function and said virtual data so that said main weight function equals a value other than zero at one of said sampler points and equal zero at remaining sample points, and;

(c) means for calculating interpolation values of said free-form surface using said main weight function and said virtual data to obtain data indicative of a modified three-dimensional free-form surface;

(d) means for displaying said modified three-dimensional free-form surface by said display unit;

(e) means for adjusting said data representing said sample points in response to commands inputted by said user;

(f) means for adjusting said auxiliary weight function based on adjusted said data representing said sample points in response to commands inputted by said user; and means for repeating said steps (b) to (f) as long as said commands are inputted in said step (e) or (f) to obtain a finally modified three-dimensional free-form surface.

BRIEF DESCRIPTION OF THE DRAWINGS

The features of the present invention will be more clearly understood by referring to the drawings attached hereto, in which.

DETAILED DESCRIPTION OF THE PREFERRED EMBODIMENT

Figure 1:
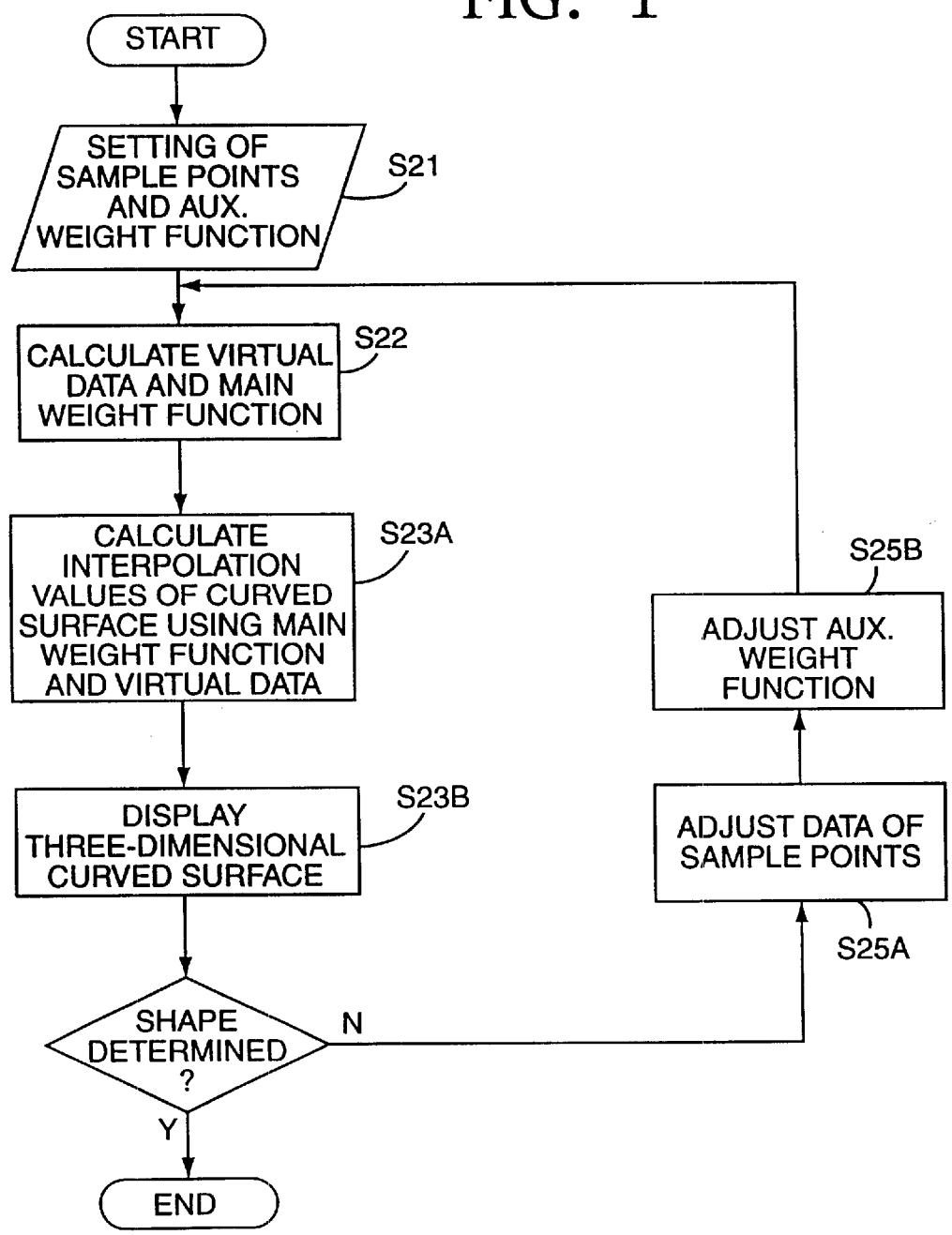
FIG. 1 is a flow chart for explaining outline of a method for designing a three-dimensional free-form surface of the present invention.

In the following, description will be given on an embodiment of the present invention.

First, a method for designing a three-dimensional free-form surface of the present invention will be described.

Now let us consider the way of expression of a free-form surface under the condition that N sample points $\{(U_i, V_i, Y_i)\}(1 \leq i \leq N)$ are collected (N is a natural number) in uvy coordinate space, using an equation, which has coordinate components of these sample points as coefficients and satisfies them. The number N of the sample points must be 3 or more in order to characterize the shape of the free-form surface.

When these sample points are moved, the coefficients in the equation of the free-form surface are also changed accordingly. Thus, the shape of the free-form surface can be changed efficiently. That is, these sample points fulfill functions of control points to change the shape of the free-form surface.

In the conventional type Bezier surface or NURBS surface, control points are not present on free-form surface, whereas in the invention these sample points functioning as control points are positioned on the free-form surface, and it is possible to easily change the free-form surface as desired. It is supposed that the equation to express a free-form surface is:

$$y = \frac{\sum_{j}^{N} K1j\,(u, v)\,Yj^+}{\sum_{j}^{N} K1j\,(u, v)} \quad (8)$$

in order that the equation for the free-form surface is determined by N sample points in uvy coordinate space.

Here, $K1j$ ($1 \leq j \leq N$; N is a natural number.) is a weight function (hereinafter referred as main weight function), and $Yj^+$ is y coordinate of control point, which changes the shape of the free-form surface expressed by the equation (8).

In the equation (8), to satisfy the condition that the sample points $(U_i, V_i, Y_i)$ are the points on the free-form surface of the equation (8) and are control points to change the shape of the free-form surface, the following relation-ship must exist:

$$K1j(Ui,\ Vi) = \delta ij$$

where, $$\delta ij = \begin{cases} 1 & \text{when } i = j \\ 0 & \text{when } i \neq j, \end{cases} \quad 1 \leq i \leq N,\ 1 \leq j \leq N \quad (9)$$

Specifically, main weight functions $\{K1j(u, v)\}$ should be obtained for each of said sample points so that, except one of sets of a first component and a second component of three-dimensional coordinate data of the sample points, the values to the other sets are 0. In the equation (9), it is assumed that $\delta=1$ when $i=j$. In this case, $\delta$ may be any value if it is a value other than 0.

Therefore, by obtaining the main weight functions $\{K1j(u, v)\}$, which satisfies the equation (9), an equation for free-form surface:

$$y = \frac{\sum_{j}^{N} K1j(u, v) Yj}{\sum_{j}^{N} K1j(u, v)} \tag{10}$$

is determined for a free-form surface, which has N sample points (Ui, Vi, Yi) as the points on the free-form surface and as control points.

Thus, to obtain the main weight functions $\{K1j(u, v)\}$, it is assumed that a point for virtual data $\{(Um, Vm, Yjm^*)\}$ ($1 \leq m \leq N$), and that the main weight function $K1j(u, v)$ is equal to a function obtained by smoothing the virtual data $\{Ujm^*\}$ by functions $\{K2m\}$ already known (hereinafter referred as auxiliary weight function).

That is, it is supposed that:

$$K1j(u, v) = \frac{\sum_{m}^{N} K2m(u, v) Yjm^*}{\sum_{m}^{N} K2m(u, v)} \tag{11}$$

By adjusting this auxiliary weight function, fine adjustment of curved surface can be achieved.

To the sets (Ui, Vi) of a first component and a second component of three-dimensional coordinate data of the sample points, the equation (11) is:

$$K1j(Ui, Vi) = \frac{\sum_{m}^{N} K2m(Ui, Vi) Yjm^*}{\sum_{m}^{N} K2m(Ui, Vi)} \tag{12}$$

From the equation (9) and the equation (12), $$(K1j(Ui, Vi) =) \frac{\sum_{m}^{N} K2m(Ui, Vi) Yjm^*}{\sum_{m}^{N} K2m(Ui, Vi)} = \delta ij$$

where, $$\delta ij = \begin{cases} 1 & \text{when } i = j \\ 0 & \text{when } i \neq j, \end{cases} \quad 1 \leq i \leq N, \quad 1 \leq j \leq N \tag{13}$$

In other words, $$K_{11} \begin{cases} K_{11}(U_1, V_1) = \frac{K_{21}(U_1, V_1)Y_{11}^* + K_{22}(U_1, V_1)Y_{12}^* + \ldots + K_{2N}(U_1, V_1)Y_{1N}^*}{K_{21}(U_1, V_1) + K_{22}(U_1, V_1) + \ldots + K_{2N}(U_1, V_1)} = 1 \\ K_{11}(U_2, V_2) = \frac{K_{21}(U_2, V_2)Y_{11}^* + K_{22}(U_2, V_2)Y_{12}^* + \ldots + K_{2N}(U_2, V_2)Y_{1N}^*}{K_{21}(U_2, V_2) + K_{22}(U_2, V_2) + \ldots + K_{2N}(U_2, V_2)} = 0 \\ \vdots \\ K_{11}(U_N, V_N) = \frac{K_{21}(U_N, V_N)Y_{11}^* + K_{22}(U_N, V_N)Y_{12}^* + \ldots + K_{2N}(U_N, V_N)Y_{1N}^*}{K_{21}(U_N, V_N) + K_{22}(U_N, V_N) + \ldots + K_{2N}(U_N, V_N)} = 0 \end{cases}$$

$$\vdots$$

$$K_{1n} \begin{cases} K_{1n}(U_1, V_1) = \frac{K_{21}(U_1, V_1)Y_{n1}^* + K_{22}(U_1, V_1)Y_{n2}^* + \ldots + K_{2N}(U_1, V_1)Y_{nN}^*}{K_{21}(U_1, V_1) + K_{22}(U_1, V_1) + \ldots + K_{2N}(U_1, V_1)} = 0 \\ \vdots \\ K_{1n}(U_{n-1}, V_{n-1}) = \frac{K_{21}(U_{n-1}, V_{n-1})Y_{n1}^* + K_{22}(U_{n-1}, V_{n-1})Y_{n2}^* + \ldots + K_{2N}(U_{n-1}, V_{n-1})Y_{nN}^*}{K_{21}(U_{n-1}, V_{n-1}) + K_{22}(U_{n-1}, V_{n-1}) + \ldots + K_{2N}(U_{n-1}, V_{n-1})} = 0 \\ K_{1n}(U_n, V_n) = \frac{K_{21}(U_n, V_n)Y_{n1}^* + K_{22}(U_n, V_n)Y_{n2}^* + \ldots + K_{2N}(U_n, V_n)Y_{nN}^*}{K_{21}(U_n, V_n) + K_{22}(U_n, V_n) + \ldots + K_{2N}(U_n, V_n)} = 1 \\ K_{1n}(U_{n+1}, V_{n+1}) = \frac{K_{21}(U_{n+1}, V_{n+1})Y_{n1}^* + K_{22}(U_{n+1}, V_{n+1})Y_{n2}^* + \ldots + K_{2N}(U_{n+1}, V_{n+1})Y_{nN}^*}{K_{21}(U_{n+1}, V_{n+1}) + K_{22}(U_{n+1}, V_{n+1}) + \ldots + K_{2N}(U_{n+1}, V_{n+1})} = 0 \\ \vdots \\ K_{1N}(U_N, V_N) = \frac{K_{21}(U_N, V_N)Y_{n1}^* + K_{22}(U_N, V_N)Y_{n2}^* + \ldots + K_{2N}(U_N, V_N)Y_{nN}^*}{K_{21}(U_N, V_N) + K_{22}(U_N, V_N) + \ldots + K_{2N}(U_N, V_N)} = 0 \end{cases}$$

$$\vdots$$

$$K_{1N} \begin{cases} K_{1N}(U_1, V_1) = \frac{K_{21}(U_1, V_1)Y_{N1}^* + K_{22}(U_1, V_1)Y_{N2}^* + \ldots + K_{2N}(U_1, V_1)Y_{NN}}{K_{21}(U_1, V_1) + K_{22}(U_1, V_1) + \ldots + K_{2N}(U_1, V_1)} = 0 \\ \vdots \\ K_{1N}(U_N, V_N) = \frac{K_{21}(U_N, V_N)Y_{N1}^* + K_{22}(U_N, V_N)Y_{N2}^* + \ldots + K_{2N}(U_N, V_N)Y_{NN}^*}{K_{21}(U_N, V_N) + K_{22}(U_N, V_N) + \ldots + K_{2N}(U_N, V_N)} = 1 \end{cases}$$

$$(14)$$

$$(2 \leq n \leq N - 1)$$

From these (N×N) simultaneous equations, (N×N) virtual data {Yjm*} can be obtained.

Substituting these virtual data {Yjm*} into the equation (11), the main weight functions {K1j(u, v)} are determined. Further, an equation (10) to express the free-form surface is determined, by smoothing a plurality of the third component of three-dimensional coordinate data of the sample points by these main weight functions {K1j(u, v)}.

From this equation (10) of free-form surface, interpolation values {y} to arbitrary values of (u, v) are calculated, and a three-dimensional graph of the free-form surface is prepared on a two-dimensional plane based on these interpolation values.

The main weight functions {K1j(u, v)} in the equation (10) is determined in such manner that the free-form surface passes through N sample points. Further, because a plurality of the third component of the three-dimensional coordinate data of the sample points are used as coefficient in the equation, it is possible to change the shape of the free-form surface as desired by watching the above three-dimensional graph of the free-form surface with the third component of the three-dimensional coordinate data of the sample points being changed, i.e. by moving the sample points in direction of y axis.

Also, it is possible to change the shape of the free-form surface by adjusting auxiliary weight functions {K2m(u, v)}.

Using the flow chart of FIG. 1, the above procedure can be explained as follows:

The flowchart of FIG. 1 shows the operations of a central processing unit of a computer which performs various calculations necessary for displaying three-dimensional graphs. In a first step S21, a plurality of three-dimensional positional data are set, The positional data respectively represent sample points or data points located on a desired or objective three-dimensional free-form surface to be generated. In this first step S21, at least one auxiliary weight function is also set. The above-mentioned positional data and the auxiliary weight function are set to be stored in a memory of the computer in response to commands inputted by a user using a keyboard or the like.

In a following second step S22, virtual data is calculated using the three-dimensional positional data and the auxiliary weight function The virtual data {Yjm*} are obtained by the equations (9) and (12). Then at least one main weight function is calculated using the auxiliary weight function and the virtual data using equation (11) such that the virtual data is smoothed using the auxiliary weight function so that the main weight function equals a value other than zero at one of the sample points and equals zero at remainder of the sample points. The equation (9) expresses the fact that the main weight function K1j(u, v) is present for each of the sample points, whereby, except for one of the sets (Ui, Vi) of a first component and a second components of three-dimensional coordinate data of the sample points, function values for all other sets are 0.

The equation (12) demonstrates that the main weight functions (K1j(u, v)) are obtained by smoothing the virtual data {Yjm*} using the auxiliary weight functions {K2m(u, v)}.

Then in a following third step S23A, interpolation values of the free-form surface are calculated using the main weight function {K1j(u, v)} and the virtual data {Yjm*} using equation (10) to obtain data indicative of a modified three-dimensional free-form surface. In a following fourth step S23B, the modified three-dimensional free-form surface is displayed on a screen of the display unit.

In a following fifth step S24, it is checked whether or not the shape of the modified free-form surface is determined as a final one using a command inputted from by the user. More specifically, when the user is satisfied with the displayed surface on the screen of the display unit, he or she gives a command so that no further adjustment is performed, and the program flow will be terminated. On the other hand, when it is intended to further modify or adjust the displayed surface, the user gives a command so that the answer of the step S24 will be NO.

When the answer of the step S24 is NO, a step S25A will be performed, to adjust the data representing the sample points in response to commands inputted by the user. In a following step S25B, the auxiliary weight function is adjusted in response to commands inputted by the user. After finishing the operations in the step S25B, the program flow goes back to the step S22 so that the adjusted auxiliary weight function will be used in the calculation of the main weight function and the virtual data.

The above-described steps S22 to S25B are repeated as long as the commands are inputted so that the answer of the step S24 will be NO. As a result, a finally modified three-dimensional curved surface is displayed on the screen.

In case a three-dimensional curved surface is prepared on a conventional type-freeform surface such as Bezier surface, it is prepared by connecting a number of patches (small curved surfaces), while it is difficult to smoothly connect the patches, and the resultant curved surface often has seams.

By the method of the present invention, the main weight functions {K1j(u, v)} in the equation (1) of the free-form surface can be obtained as differentiable continuous function by as many times as desired. Thus, the equation (10) for free-form surface can be differentiated over the whole region by as many times as desired. As the result, smooth and seamless three-dimensional surface can be designed.

Next, description will be given on an embodiment of an apparatus for designing a three-dimensional free-form surface of the present invention based on the above method.

Figure 2:
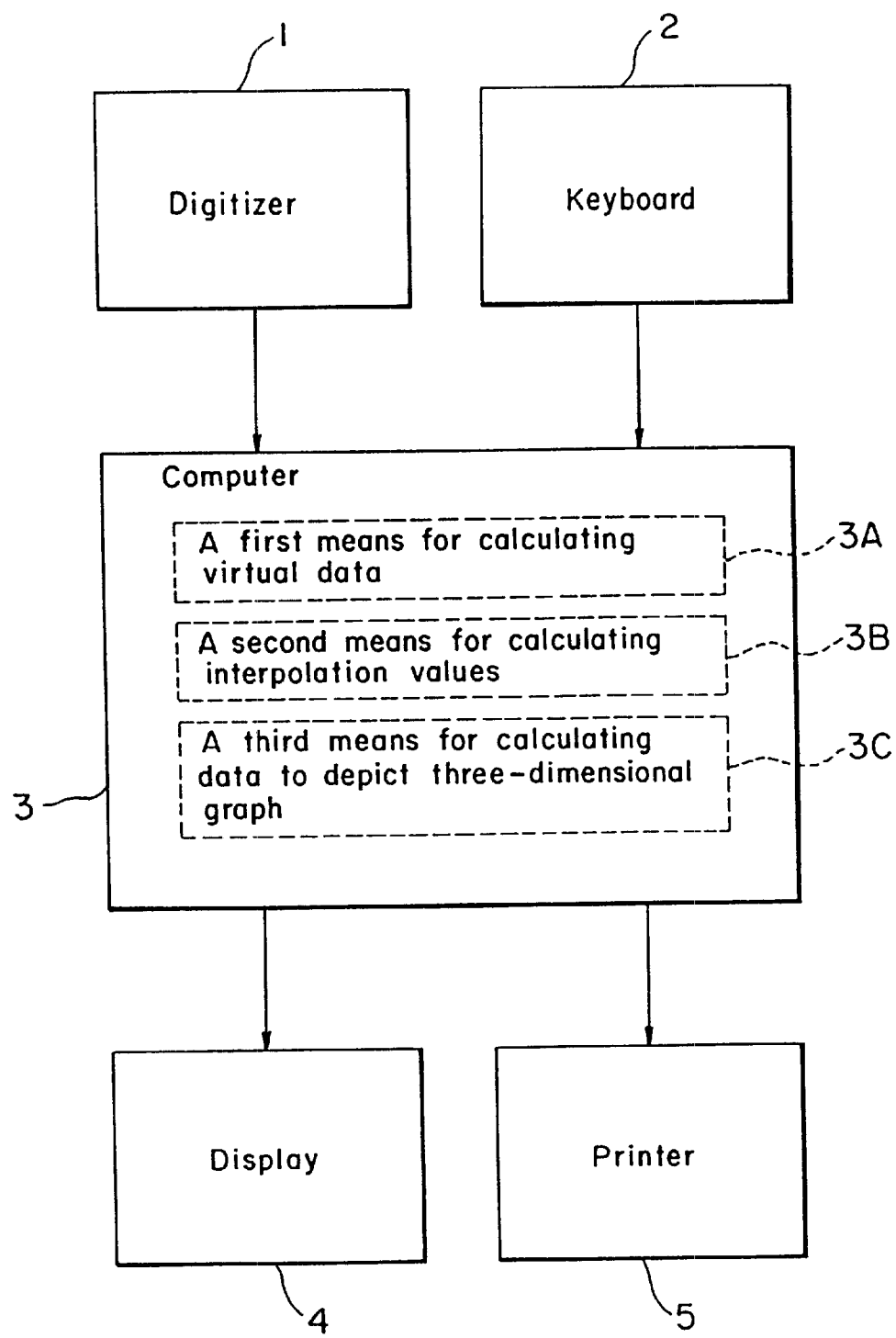
FIG. 2 is a block diagram of an embodiment of an apparatus for designing a three-dimensional free-form surface of the present invention.

FIG. 2 is a block diagram showing an embodiment of an apparatus for designing a three-dimensional free-form surface of the present invention.

As input unit, a digitizer 1 and a keyboard 2 are used. For example, in case three-dimensional coordinate data of sample points on a three-dimensional object are collected for modifying curved surface of a three-dimensional object existing in natural environment, input is performed only by the digitizer 1. For three-dimensional data of sample points including data such as altitude shown on a map, coordinates on the map are collected by the digitizer 1 as two-dimensional data, and the data such as altitude are inputted from the keyboard 2. In case a free-form surface is designed newly, three-dimensional coordinate data of the sample points for designing are inputted from the keyboard 2. As data, it is preferable to use three or more points, which reliably express features of the shape of the three-dimensional object.

A computer 3, used as a computing unit, is provided with a first means 3A for calculating virtual data {Yjm*} ($1 \leq m \leq N$) to obtain main weight functions {K1j(u, v)}, whereby a function value to one of sets (Ui, Vi) of a first component and a second component of three-dimensional coordinate data of the sample points is a value other than 0 (for example, 1 in this case), and function values to the other sets of sample points are 0 based on the three-dimensional data {(Ui, Vi, Yi)} ($1 \leq i \leq N$) of three or more sample points inputted through the input unit and auxiliary weight functions K2m(u, v) ($1 \leq m \leq N$) with a second means 3B for obtaining interpolation values {yk} to any point {(uk, vk)} ($1 \leq k \leq M$; k and M are natural numbers. It is preferable that the number M is large enough to depict three dimensional graph of the free-form, surface) on uv plane by a plurality of a third component {Y} ($1 \leq i \leq N$) of three-dimensional coordinate data of the sample, points and each of the main weight functions {K1j(u, v)} obtained by said virtual data {Yjm*} and said auxiliary weight functions {K2m(u, v)} and with a third means 3C for calculating data to depict a three-dimensional graph from the points (uk, vk, yk) on the free-form surface obtained by the second means 3B.

A display 4 and a printer 5 serving as a display unit display three-dimensional graph of the free-form surface in response to output of the computer 3.

The keyboard 2 and the computer 3 also serve as a first adjusting unit, by which user manually adjusts the third component {Yi} of three-dimensional coordinate data of said sample points while watching three-dimensional graph displayed on the display 4 or the printer 5, as a second adjusting unit for manually adjusting coefficients in auxiliary weight functions {K2m(u, v)}, and also as a specifying unit for specifying a computation equation itself of the auxiliary weight functions {K2m(u, v)}.

Figure 3:
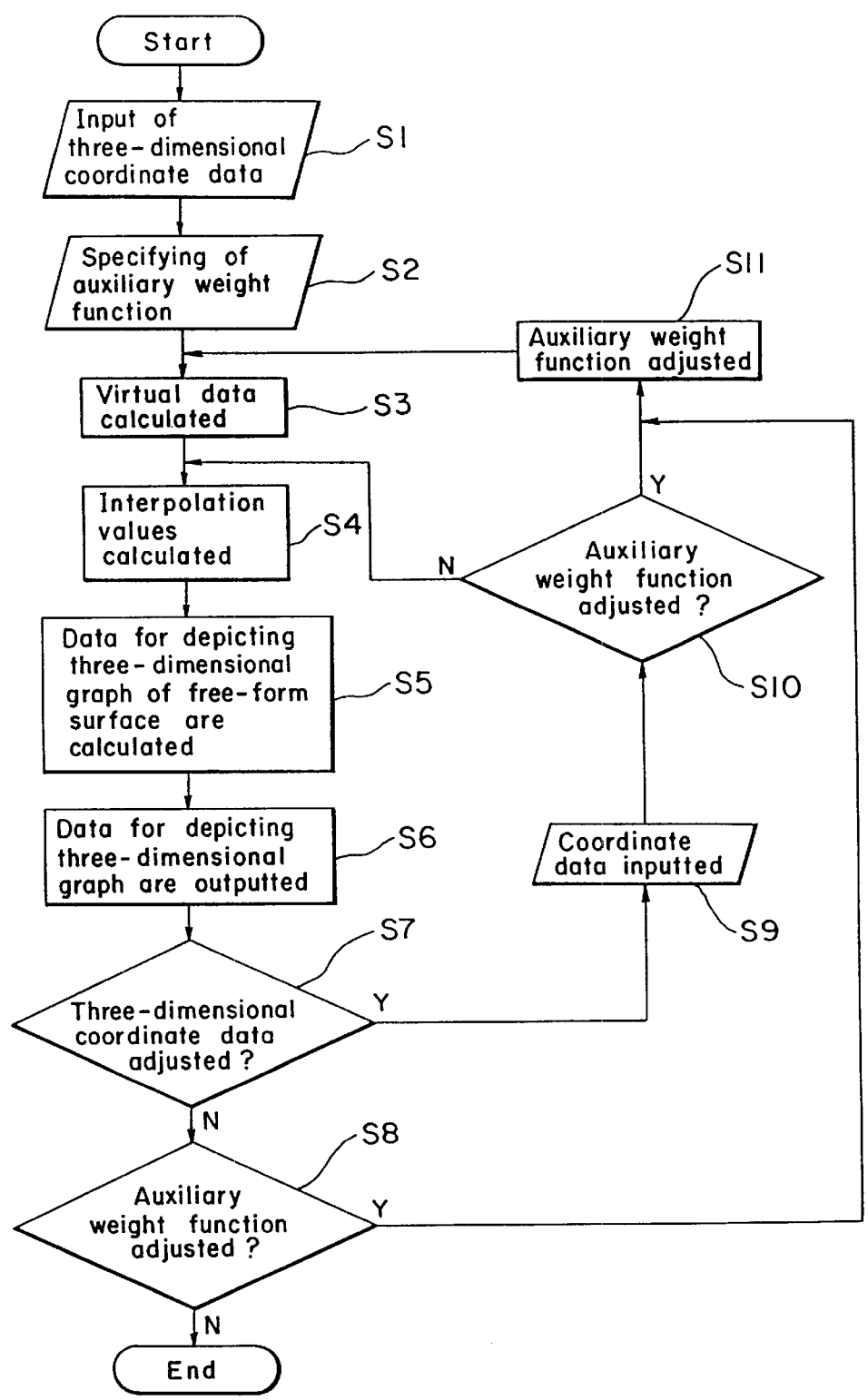
FIG. 3 is a flow chart of an embodiment of the method for designing a three-dimensional free-form surface of the present invention.

In the following, description will be given on operation of the computer 3, using the flow chart of FIG. 3.

First, three-dimensional data {(Ui, Vi, Yi)} ($1 \leq i \leq N$) of N sample points (N=3 or more) are inputted from the digitizer 1 in the first step S1.

Next, computation equation of the auxiliary weight functions {K2m(u, v)} are specified by the user in the second step S2 through a keyboard 2, depending upon property of the data. For example, it is supposed that the equation:

$$K2m(u, v)=\exp\{-a1(u-Um)^2-a2(v-Vm)^2\}(1 \leq m \leq N) \quad (15)$$

is specified. a1 and a2 are constants determined according to the property of the data, and these are defined in the second step S2.

In the third step S3, virtual data {Yjm*} ($1 \leq m \leq N$; $1 \leq j \leq N$) are obtained from three-dimensional data {(Ui, Vi, Yi)}($1 \leq i \leq N$) of N sample points inputted in the first step S1 and by auxiliary weight functions {K2m(u, v)} ($1 \leq m \leq N$). That is, a solution {Yjm*} of the simultaneous equations (14) to each value of j and m is obtained. Substituting {Yjm*} ($1 \leq m \leq N$; $1 \leq j \leq N$) from the simultaneous equations in the equation (11), N main weight functions {K1j(u, v)} are obtained.

In the fourth step S4, the equation (10) of the free-form surface is determined by N main weight functions {K1j(u, v)} and a plurality of the third component {Yi} of three-dimensional coordinate data of the sample points, and interpolation values {yk} to arbitrary points {(uk, vk)} ($1 \leq k \leq M$; M is a natural number. It is preferable that the number M is large enough to depict three-dimensional graph of the free-form surface) on uv plane are obtained.

In the fifth step S5, the data for depicting a three-dimensional graph on a two-dimensional plane are calculated by points {(uk, vk, yk)} on the free-form surface obtained in the fourth step.

The procedures in the third step S3, the fourth step S4, and the fifth step S5 are performed by the first means 3A, the second means 3B and the third means 3C of the computer 3 of block diagram shown in FIG. 2.

In the sixth step S6, the data for depicting a three-dimensional graph on a two-dimensional plane as calculated in the fifth step S5 are outputted. The display 4 and the printer 5 serving as the display unit of FIG. 2 display three-dimensional graph of the free-form surface based on the data outputted in the sixth step S6.

In the seventh step S7, user checks and examines the shape of the free-form surface in the three-dimensional graph displayed by the display 4 and the printer 5 and makes decision as to whether adjustment should be made on the third component {Yi} of three-dimensional coordinate data of the sample points in order to change the shape of the free-form surface.

Similarly, in the eighth step S8, the shape of the free-form surface is checked and examined based on the three-dimensional graph displayed by the display 4 and the printer 5, and it is decided whether adjustment should be made on coefficients (a1, a2) in the equation (15) of auxiliary weight functions {K2m(u, v)} in order to change the shape of the free-form surface.

Therefore, if the user does not adjust the third component {Yi} of the three-dimensional coordinate data of the sample points and the coefficients (a1, a2) of auxiliary weight function, the shape of the free-form surface is determined.

In case the third component {Yi} of three-dimensional coordinate data of the sample points is changed, the third component {Yi} of three-dimensional coordinate data is changed through a first adjusting unit in the ninth step S9. Further, in the tenth step S10, it is decided whether adjustment should be made on the coefficients (a1, a2) of auxiliary weight function. In case the coefficients (a1, a2) of auxiliary weight functions {K2m(u, v)} are adjusted, the coefficients (a1, a2) of auxiliary weight functions {K2m(u, v)} are inputted again through a second adjusting unit in the eleventh step S11, and the procedure returns to the third step S3. In case the user does not adjust auxiliary weight functions {K2m(u, v)}, the procedure returns to the fourth step S4.

In case the user does not change the third component {Yi} of three-dimensional coordinate data of the sample points and changes only the coefficients (a1, a2) of auxiliary weight functions {K2m(u, v)}, the coefficients (a1, a2) of auxiliary weight functions {K2m(u, v)} are inputted again in the eleventh step S11, and the procedure returns to the third step S3.

Figure 4:
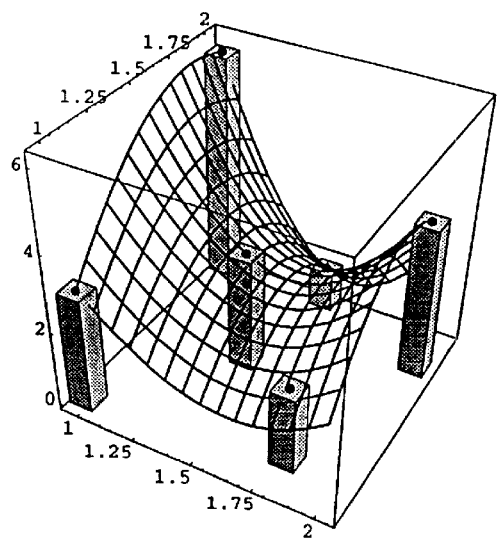
FIG. 4 is a three-dimensional graph of a free-form surface obtained from 6 sample points on the three-dimensional free-form surface designing apparatus of the embodiment of the present invention.

FIG. 4 shows a three-dimensional graph of a free-form surface obtained from 6 sample points using the apparatus for designing three-dimensional freeform surface of the above embodiment. In this case, a1=a2=1 in the equation (15).

Figure 5:
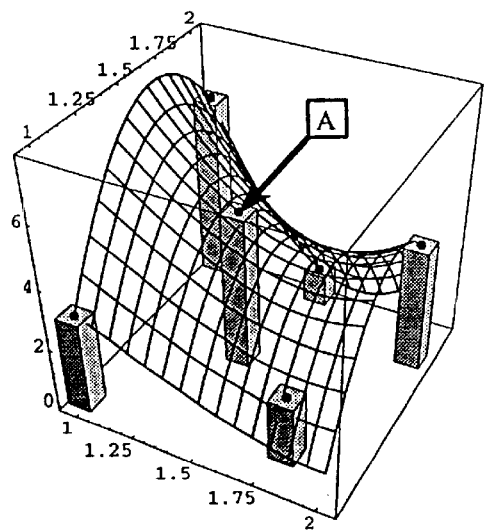
FIG. 5 is a three-dimensional graph of a free-form surface newly obtained when a sample point A on the free-form surface is moved toward a direction on the three-dimensional free-form surface designing apparatus of the embodiment of the present invention.

FIG. 5 shows a three-dimensional graph of a free-form surface obtained by moving a sample point A in order to increase the third component of three-dimensional coordinate data of the sample point A, which also serves as a control point of the free-form surface of FIG. 4.

Figure 6:
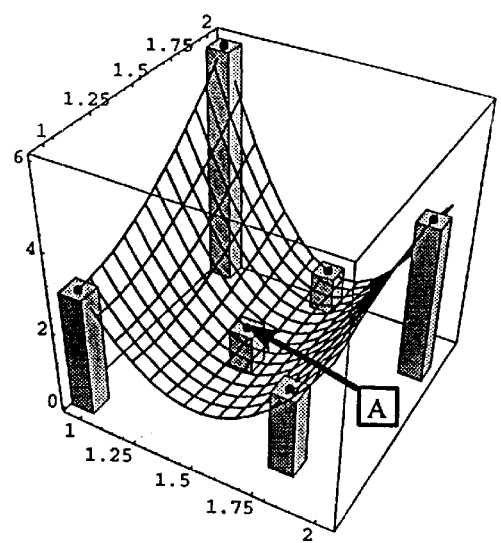
FIG. 6 is a three-dimensional graph of a free-form surface obtained when the sample point A on the free-form surface is moved in another direction in the three-dimensional free-form surface designing apparatus of the embodiment of the present invention.

FIG. 6 shows a three-dimensional graph of a free-form surface obtained by moving a sample point A in order to decrease the third component of three-dimensional coordinate data of the sample point A in FIG. 4.

Figure 7:
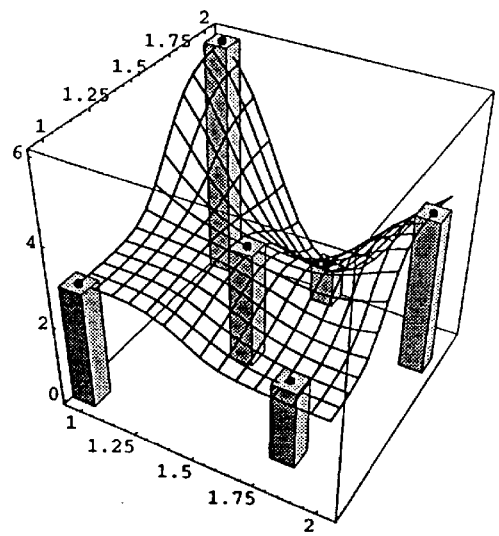
FIG. 7 is a three-dimensional graph of a free-form surface when coefficients of auxiliary weight function for obtaining an equation of the free-form surface are adjusted in the three-dimensional free-form surface designing apparatus of the embodiment of the present invention.
Figure 8:
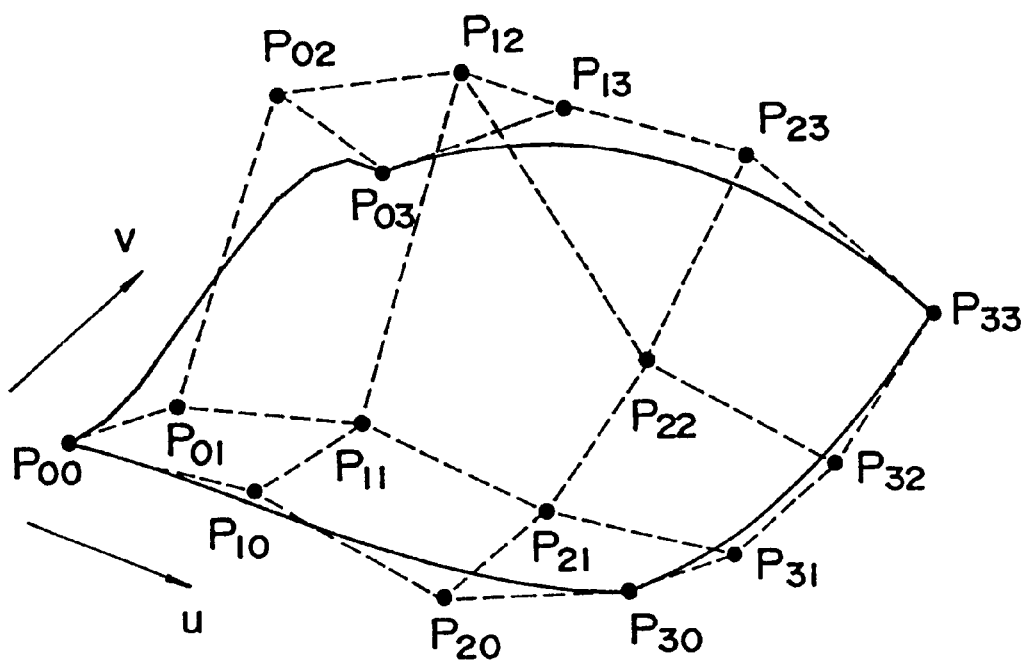
FIG. 8 shows an example of Bezier curved surface, which is one of conventional type expression modes of free-form surface.

FIG. 7 represents a three-dimensional graph of a free-form surface obtained when the coefficients (a1, a2) of auxiliary weight functions {K2m(u, v)} of the equation (15) was the free-form surface expressed by the three-dimensional graph of FIG. 4 is obtained are a1=a2=10.

In the apparatus for designing three-dimensional free-form surface of the above embodiment, keyboards are used for the first adjusting unit for manual adjustment of the third component {Yi} of three-dimensional coordinate data of the sample points by the user, for the second adjusting unit for manually adjusting the coefficients (a1, a2) of auxiliary weight functions {K2m(u, v)}, and also for a specifying unit for specifying the computation equation itself of the auxiliary weight functions {K2m(u, v)}, whereas other input unit may be used. Also, if the shape of the free-form surface can be changed as desired by the first adjusting unit for manual adjustment of the third component {Yi} of the three dimensional coordinate data of the sample points, either the second adjusting unit or the specifying unit or both may not be used.

What is claimed is:

1. A method of interactively generating data indicative of a three-dimensional free-form surface and visually displaying the surface by a display unit, comprising the steps of:

(a) setting three-dimensional positional data representing sample points on said three-dimensional free-form surface to be generated and at least one auxiliary weight function both in response to commands inputted by a user;

(b) calculating virtual data using the three-dimensional positioned data and said auxiliary weight function, and calculating at least one main weight function using said auxiliary weight function and said virtual data so that said main weight function equals a value other then zero at one sample point and equals zero at remaining sample point, and;

(c) calculating interpolation values of said free-form surface using said main weight function and said virtual data to obtain data indicative of a modified three-dimensional free-form surface;

(d) displaying said modified three-dimensional free-form surface by said display unit;

(e) adjusting said data representing said sample points in response to commands inputted by said user;

(f) adjusting said auxiliary weight function based on adjusting said data representing said sample points in response to commands inputted by said user; and (g) repeating said steps (b) to (f) as long as said commands are inputted in said step (e) or (f) to obtain a finally modified three-dimensional free-form surface.

2. The method according to claim 1, wherein said step of calculating at least one main weight function comprises a step of calculation using said virtual data under the condition that said main weight function(s) is/are equal to one obtained by smoothing said virtual data using said auxiliary weight function(s).

3. The method according to claim 1, wherein said step of adjusting said auxiliary weight function comprises a step of changing at least one coefficient of said auxiliary weight function(s).

4. An apparatus for interactively generating data indicative of a three-dimensional free-form surface and visually displaying the surface by a display unit, comprising:

(a) means for setting three-dimensional positioned data representing sample points on said three-dimensional free-form surface to be generated and at least one auxiliary weight function both in response to commands inputted by a user;

(b) means for calculating virtual data using said three-dimensional positional data and said auxiliary weight function and for calculating at least one main weight function using said auxiliary weight function and said virtual data so that said main weight function equals a value other than zero at one sample point and zero at remaining sample points, and;

(c) means for calculating interpolation values of said free-form surface using said main weight function and said virtual data to obtain data indicative of a modified three-dimensional free-form surface;

(d) means for displaying said modified three-dimensional free-form surface by said display unit;

(e) means for adjusting said data representing said sample points in response to commands inputted by said user;

(f) means for adjusting said auxiliary weight function based on adjusting said data representing said sample points in response to commands inputted by said user; and (g) means for repeating said steps (b) to (f) as long as said commands are inputted in said step (e) to (f) to obtain a finally modified three-dimensional free-form surface.

* * * * *